US008730570B2

(12) United States Patent
Lin

(10) Patent No.: US 8,730,570 B2
(45) Date of Patent: May 20, 2014

(54) OPTICAL PULSE COMPRESSING BASED ON CHIRPED FIBER BRAGG GRATINGS FOR PULSE AMPLIFICATION AND FIBER LASERS

(75) Inventor: Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 736 days.

(21) Appl. No.: 12/829,364

(22) Filed: Jul. 1, 2010

(65) Prior Publication Data
US 2011/0002691 A1 Jan. 6, 2011

Related U.S. Application Data

(60) Provisional application No. 61/269,979, filed on Jul. 1, 2009.

(51) Int. Cl.
*H01S 3/10* (2006.01)
*H04B 10/17* (2011.01)

(52) U.S. Cl.
USPC .......................... 359/349; 372/25; 359/341.1

(58) Field of Classification Search
USPC .................. 359/341.1, 349; 372/25
See application file for complete search history.

(56) References Cited

U.S. PATENT DOCUMENTS

| | | | | |
|---|---|---|---|---|
| 5,499,134 A * | 3/1996 | Galvanauskas et al. | ...... | 359/333 |
| 5,696,782 A * | 12/1997 | Harter et al. | ...... | 372/25 |
| 5,847,863 A | 12/1998 | Galvanauskas et al. | | |
| 6,108,474 A * | 8/2000 | Eggleton et al. | ...... | 385/122 |
| 7,113,327 B2 * | 9/2006 | Gu et al. | ...... | 359/337.5 |
| 7,782,912 B2 | 8/2010 | Harter et al. | | |
| 8,228,597 B2 * | 7/2012 | Fermann et al. | ...... | 359/333 |
| 8,353,899 B1 | 1/2013 | Wells et al. | | |
| 8,532,150 B1 | 9/2013 | Tong et al. | | |
| 8,537,866 B2 | 9/2013 | Lin | | |
| 2003/0112494 A1 | 6/2003 | Barty et al. | | |
| 2005/0041702 A1 * | 2/2005 | Fermann et al. | ...... | 372/25 |
| 2009/0046352 A1 | 2/2009 | Brunet et al. | | |
| 2009/0097515 A1 * | 4/2009 | Harter et al. | ...... | 372/25 |
| 2010/0189392 A1 | 7/2010 | Rockwell et al. | | |
| 2011/0211598 A1 | 9/2011 | Liu et al. | | |
| 2011/0249321 A1 | 10/2011 | Savage-Leuchs et al. | | |
| 2012/0062984 A1 | 3/2012 | Tong et al. | | |

FOREIGN PATENT DOCUMENTS

WO 2005094275 A2 10/2005

OTHER PUBLICATIONS

Banks, P.S., et al., "Novel All-Reflective Stretcher for Chirped-Pulse Amplification of Ultrashort Pulses," IEEE Journal of Quantum Electronics, vol. 36(3):268-274, Mar. 2000.
Zhou, Yue, et al., "All-Fiber-Based Ultrashort Pulse Generation and Chirped Pulse Amplification Through Parametric Processes," IEEE Photonics Technology Letters, vol. 22(17):1330-1332, Sep. 1, 2010.

* cited by examiner

*Primary Examiner* — Eric Bolda
(74) *Attorney, Agent, or Firm* — Perkins Coie LLP

(57) ABSTRACT

Techniques and devices for using a chirped fiber Bragg grating to compress amplified laser pulses.

37 Claims, 7 Drawing Sheets

OPTICAL PULSE COMPRESSING BASED ON CHIRPED FIBER BRAGG GRATINGS FOR PULSE AMPLIFICATION AND FIBER LASERS

PRIORITY CLAIM

This patent document claims the benefits of the U.S. provisional application No. 61/269,979 entitled "Chirped fiber Bragg grating (CFBG) optical pulse compressor for all fiber chirped pulse amplifier system" and filed by Anthony Hong Lin on Jul. 1, 2009, the entire disclosure of which is incorporated by reference as part of this document.

BACKGROUND

This document relates to generation and control of laser pulses, including optical pulse compressor and optical pulse amplifiers and pulse lasers.

Various optical amplifiers are designed to amplify light by providing an optical gain at the same wavelength of the light to be amplified so that the light, after transmitting through an optical gain medium of the optical amplifier, is amplified in its power or energy and the amplified light is at the same wavelength of the original light prior to the amplification. The optical gain of the optical amplifier can be obtained by pump light that optically excites the optical gain medium such as a Nd or Yb doped fiber amplifier, or by an electrically energized gain medium such as a semiconductor optical amplifier based on quantum wells and other gain mechanisms.

SUMMARY

This document describes techniques and devices for using a chirped fiber Bragg grating to compress amplified laser pulses and applications in pulse amplification devices and pulse fiber lasers. Various implementations are described in detail in the drawings, the description and the claims.

BRIEF DESCRIPTION OF THE DRAWINGS

FIG. 5A shows the pulse parameter before nonlinear pulse compression and FIG. 5B shows the pulse parameter after nonlinear pulse compression.

DETAILED DESCRIPTION

Figure 1:
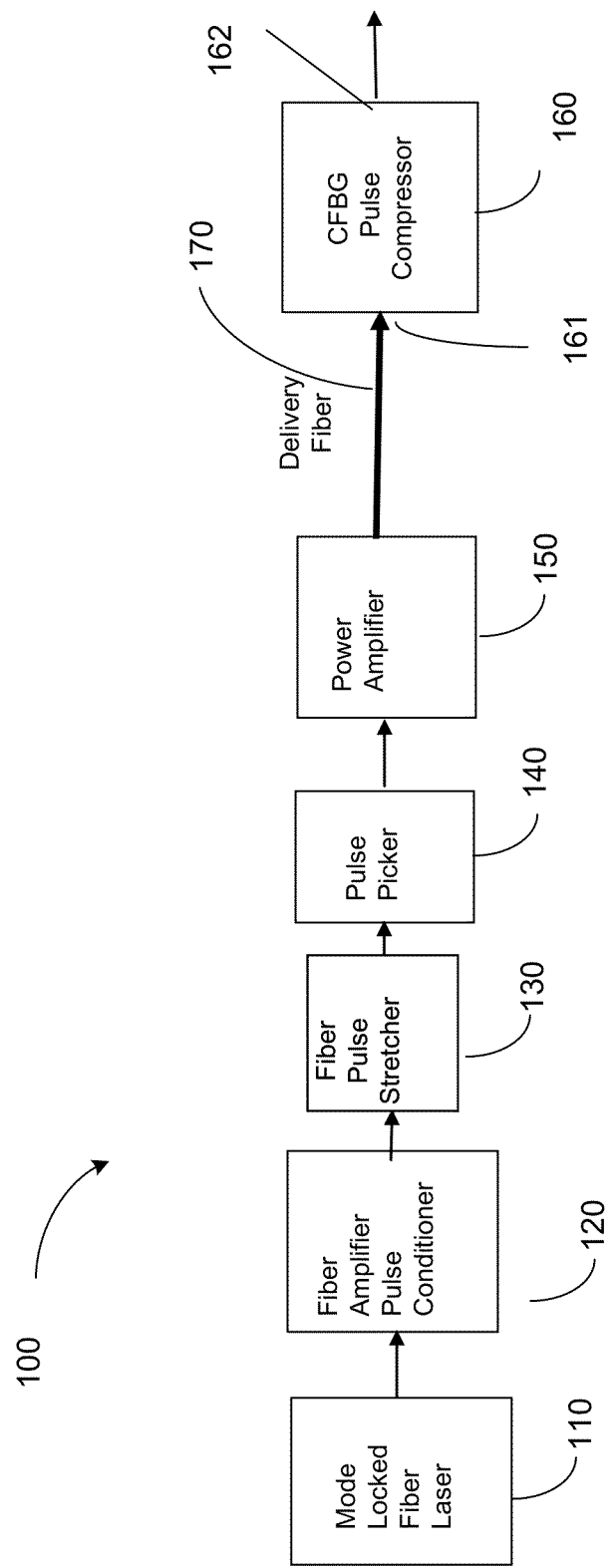
FIG. 1 shows one example of a pulsed laser having a pulse stretcher, an optical amplifier and a pulse compressor.

Optical fiber used in various fiber systems and devices can exhibit one or more nonlinear optical effects. Such nonlinear optical effects in optical fiber can be undesirable in some application while desirable in others.

For example, stimulated Raman Scattering (SRS) is a nonlinear optical interaction of light and optical phonon in the material when the intensity of light at an optical wavelength exceeds a SRS threshold. When SRS occurs, a Raman signal is generated in the same propagation direction of the original light by the non-linear SRS process in the medium at a Raman frequency that is shifted from the optical frequency of the original light by a Raman frequency detuning. The Raman frequency is usually lower than the frequency of the original light and can be higher than the frequency of the original light. In SRS, the original light acts as the pump light for generating the Raman signal and the energy of the original light is depleted and is transferred into the Raman signal via the SRS process. The SRS process in silica fiber, for example, has a Raman frequency detuning of 13.2 THz.

The SRS can lead to undesired effects in optical pulse amplification in fibers and other optical media. For example, as the intensity of the optical pulses increases to reach the SRS threshold level, the optical power in the optical pulses is depleted and thus the SRS process puts an upper limit to the optical power of the optical pulses.

In addition, optical nonlinear effects such as self-phase modulation (SPM) based on Kerr effect can accumulate as the pulses propagate and SPM usually generate new spectral components and nonlinear chirp, making it difficult to obtain short pulses which are desirable in various pulsed laser applications, such as laser material processing and other applications. Therefore, various optical pulse amplification techniques are developed to first stretch the optical pulses in the time domain to reduce the pulse peak power under the SRS threshold and to mitigate the accumulation of the optical nonlinear effects during the optical amplification process. After amplification of the stretched optical pulses, the amplified optical pulses are then compressed in time to produce desired short optical pulses.

In this regard, consider fiber lasers and amplifiers. Fiber lasers and amplifiers can have certain advantages over other laser and amplifier systems, such as compactness, maintenance-free operation, and cost-effectiveness. Due to the waveguiding nature, fibers can provide good beam quality in guided light without the need of complex optics for shaping the optical beam. The waveguiding nature of fibers, however, also renders it difficult to amplify short pulses with high peak power levels. Notably, small fiber cores in fibers lead to high optical intensity of the confined light and thus trigger optical nonlinear effects. Certain fiber amplifier systems are implemented based the chirped-pulsed amplification (CPA) to avoid or mitigate the undesired nonlinearity accumulation in fiber carrying optical pulses. In CPA, the optical pulse is first stretched in the time domain to reduce its peak power and the nonlinearity accumulation inside the high gain fiber amplifiers, and subsequently, amplified stretched pulses are compressed. In order to obtain higher energy output pulses, the stretching of the optical pulses is increased to increase the ratio between the stretched pulse duration and the compressed pulse duration. An optical pulse stretcher can be implemented with optical fiber or a CFBG to provide a fiber compatible package without requiring bulky free space optics. Such fiber systems may need to adopt free-space optics such as diffraction gratings to provide sufficient pulse compression. However, adopting free-space optics may compromise the long-term reliability and the compactness of the fiber system. In addition, it can be difficult to achieve very short pulses after the recompression due to various factors. For example, pulse stretching and compression are usually done with a large ratio, such as a pulse stretch to 100 ps (e.g., up to 1 ns to 2 ns) in the pulse duration and a pulse compression down to 0.1 to 0.2 ps in the pulse duration. Such a compression ratio of 1000 (up to 10,000 to 20,000) to 1 or 2 require precision match of the dispersion signs and magnitudes of the pulse stretcher and the pulse compressor while taking into account of the contribution of other fiber components along the paths of the optical pulses. For another example, the higher-order dispersion is not perfectly compensated, either by mismatching between the stretcher and compressor or the accumulation of higher order dispersion during the amplification.

In the devices and techniques described in this document, a pulse stretcher is used upstream from the optical power amplifier to reduce the pulse peak power and a pulse compressor is placed downstream of the optical power amplifier to compress the pulse duration and to increase the pulse peak power. The compressor can produce a relatively high peak output power and thus propagation of such compressed optical pulses in fiber can lead to undesired nonlinear optical effects and pulse broadening. In the exemplary implementations of the devices and techniques described in this document, the output optical path of the compressed optical pulses by the pulse compressor is separate from the input optical path which can be a fiber line and is primarily in free space based on free space optics to reduce the undesired nonlinear optical effects and pulse broadening in the post-compression process.

In practical implementations, it can be beneficial to have either the dispersion of the pulse stretcher or/and pulse compressor finely tunable during the final optimization of the system to achieve short optical pulses. In implementing the devices and techniques described in this document, a combination of a fiber pulse stretcher and a CFBG compressor can be used to provide desired fine tunablity of the pulse stretcher dispersion to achieve a short pulse at the CFBG compressor. For example, to achieve 0.1 ps compressed pulse, the dispersion mismatch may be set to be less than $0.005$ $ps^2$ which corresponds to a fiber length of 0.2 m based on the fact that the fiber dispersion at 1550 nm is about $0.025$ $ps^2/m$. This is a convenient length to control using standard fiber fusion splicer during the final stage of making the compressed pulse. Since the CFBG can be design to have a wide range of group velocity dispersion (GVD) values and higher order dispersion, the CFBG compressor can be designed to achieve a wide range of compression ratios. The combination of fiber pulse stretcher and CFBG compressor offer design stage flexibility as well as fine tuning capability at manufacturing stage.

The parabolic pulse amplification technique is an alternative to the CPA technique and uses the normal dispersion in optical fibers in combination with a positive gain in the fiber amplifier to produce a linearly chirped stretched optical pulse. In the parabolic pulse amplification, both the spectral and temporal pulse shape exponentially broadens along the fiber. The broadening factor depends on the input pulse energy and the gain in the amplifying fiber. The stretched parabolic pulse may be subsequently compressed through another fiber-type element, such as photonic crystal fibers. Thus, the combination of the parabolic pulse amplification technique along with the pulse-compression photonic crystal fiber can be used to achieve an all-fiber high energy short-pulse laser system.

FIG. 1 shows an example of an all fiber CPA device based on a chirped fiber Bragg grating (CFBG) pulse compressor. A seed pulsed laser 110, e.g., a mode locked fiber laser, is provided to generate laser light of short optical pulses which can have, e.g., a pulse width of sub-picosecond to a few piconseconds. The wavelength of the laser light from the laser 110 can be in various wavelengths, such as within the spectral band of Er, Er/Yb fibers around 1.55 µm, Yb fibers around 1 µm, Ho fibers around 2 µm or other rear earth element doped fiber gain bands. The laser power of the laser 110 can be in various ranges, e.g., few miliwatts. The output of mode-locked fiber laser 110 can be fed into an optional fiber amplifier/pulse conditioner 120 which is designed to boost up the pulse energy from mode-locked fiber laser 110. The fiber amplifier/pulse conditioner 120 can also recondition the optical pulse to have a desirable characteristic for the whole CPA device. One of characteristics, for example, is to have a wide bandwidth of the optical pulses. A wide bandwidth enables a short compressed pulse width at output. Another example of desirable characteristics is a linear chirp in the wide spectral width. Linear chirp makes it feasible to compress the stretched pulse to a high quality low pedestal pulse. As an example, a fiber amplifier with a normal dispersion can be used in the fiber to achieve both high energy and linear chirp output. Such a pulse amplifier is known as a parabolic amplifier. In various implementations, the input of parabolic fiber amplifier should have an appropriate energy and other parameters within a wide boundary. Under proper operating conditions, the parabolic amplifier can produce a linear chirp output at a high energy with stable output characteristics. The output of a parabolic fiber amplifier can be insensitive to the parameters of input pulse and this property can improve the stability of the CPA system. In some implementations of the device in FIG. 1, the Fiber Amplifier/Pulse conditioner 120 may be eliminated, e.g., when the mode-locked laser 110 already produces desired characteristic for the CPA system.

In FIG. 1, a pulse stretcher 130 is used to stretch laser pulses to a wide pulsewidth and may be implemented by a device with a group velocity dispersion. The pulse stretcher 130 can be implemented in form of a fiber pulse stretcher for robust operation, compact size and lightweight than various bulk grating based stretchers. For example, a fiber pulse stretcher can be a fiber grating stretcher which is constructed by, for example, (1) a single mode fiber (polarization maintaining or non-polarization maintaining) with its material dispersion and waveguide dispersion, or (2) a Chirp Fiber Bragg Grating (CFBG). Some of advantages of using a single fiber pulse stretcher are that such a pulse stretcher is adjustable and readily available at a relatively low price. The fiber pulse stretcher 130 can be designed so that the dispersion of the fiber pulse stretcher 130 is adjustable to facilitate the device optimization. For example, the dispersion of the adjustable fiber pulse stretcher 130 can be finely tuned at the final stage of the CPA system optimization. The widely available fiber fusion splicing technology makes it easy to fine tune the fiber length of the fiber pulse stretcher 130 with ease and good reliability. The advantage of a CFBG stretcher is compact and highly engineerable characteristics such as second order dispersion and third order dispersion. Fiber pulse stretchers can be designed to stretch a pulse to few picoseconds to several nanoseconds.

As an option for the CPA in FIG. 1, a pulse picker 140 can be placed after or before the pulse stretcher 130. The pulse picker modifies the pulse repetition rate to a lower rate by picking pulses of a pulse train to produce a modified pulse train at a lower pulse repetition rate. One example of a pulse picker 130 is an Acoustic Optical (AO) modulator or an Electro Optical (EO) modulator. Such a modulator is driven by an electrical gating signal to pick pulses from pulses generated by the seed laser 110. As such, the pulse picker 140 reduces the number of pulses for further amplification. This allows a higher energy per pulse to be achieved. The pulse picker 140 is not used in systems where the seed laser 110 produces a pulse train at a desirable pulse repetition rate.

In FIG. 1, an optical power amplifier 150 is provided for boosting the optical pulse energy. This optical power amplifier 150 can be implemented in various configurations. Some examples are a core pump fiber amplifier, a double clad fiber amplifier, a combination of a core pump fiber amplifier and a double clad fiber amplifier, and other amplifier designs such as solid state laser amplifiers. A solid state laser gain medium can be optically pumped by, e.g., diode lasers or flash light pump. In various amplifier designs, solid state laser amplifiers can be used to provide the last stage amplification in a multi-stage amplifier design due to their large cross sections. Exemplary materials used for solid state amplifiers include Nd:YAG, YLF, Nd:glass, and others.

The optical power amplifier 150 can include two or more stages of optical amplifiers cascaded in series. Multistage amplifiers can offer higher gains than single stage amplifiers. Although it is possible to design a single stage amplifier with a large gain, a single stage large gain amplifier in many designs tends to suffer the drawback of large backward amplified spontaneous emission (ASE) noise and low power efficiency. One example for implementing the optical power amplifier 150 can include a fiber core amplifier, a double clad fiber amplifier, and then a large core double clad amplifier. The last stage of the amplifier 150 in a multi-stage amplifier design can be a solid state laser amplifier to achieve a high output peak power without suffering nonlinear effects due to less focused beam on the solid state laser material.

One design consideration for the fiber amplifier 150 is to have low nonlinear effects. The self-phase modulation (SPM), a nonlinear effect commonly occurs in fiber, can make the output pulse difficult to compress. Raman effects in fiber can undesirably shift the wavelength of the output beam to a longer value. These and other nonlinear effects are related to the power intensity in the amplifier. The pulse stretcher 130 upstream from the optical power amplifier 150 produces stretched pulses to reduce the peak power of the optical pulses entering the optical power amplifier 150. In addition to using the pulse stretcher 130, the nonlinear effects in the optical pulses can also be reduced by using short fiber with a large core area which reduces the optical intensities of the optical pulses.

In FIG. 1, the last stage of the CPA 100 is a pulse compressor 160 downstream from the optical power amplifier 150 to compress the initially stretched optical pulses. The pulse compressor 160 is structured based on one of the CFBG compressors described in this document. This compressor 160 is compact, lightweight and robust and can be used to facilitate all fiber construction for a CPA device.

Notably, the pulse compressor 160 has separate input port 161 and output port 162 so that the compressed optical pulses produced by the pulse compressor 160 propagate along a different output optical path from that of the amplified and stretched optical pulses that enter the input port 161. This separation is provided so that the compressed optical pulses with a higher peak power produced by the pulse compressor 160 can be handled via carefully controlled output path to avoid undesired nonlinear optical effects due to the high peak power.

The optical path 170 between the optical power amplifier 150 and the pulse compressor 160 can be a waveguide such as a delivery fiber as shown or a path based on free space optics. For some applications, the use of the delivery fiber line 170 is advantageous because the delivery fiber line 170 is light weight, flexible and has a relatively low optical loss when compared with a mirror directed free space delivery path. For example, in various biomedical applications and material processing uses, the delivery fiber 170 allows an optical head containing the CFBG pulse compressor 160 to be a compact unit that can be situated at various target locations to deliver the compressed optical pulses with high peak power. The delivery fiber 170 also can be bended or routed to accommodate for the available space for routing the light to a target which can be a sample under imaging, therapy, surgery or diagnosis, or a piece of a material to be cut or treated.

On the other hand, the delivery fiber line 170 can also cause undesired nonlinear optical effects in the amplified optical pulses propagating from the amplifier 150 to the pulse compressor 160. As such, the delivery fiber line 170 can be configured based on the optical power of the optical pulses to keep a undesired nonlinear effect below an acceptable level. For typical commercial fiber used in fiber communications, the fiber nonlinear coefficient is approximately $\gamma=10^{-3}$/m-watt. For many applications, the nonlinear effects are tolerable or acceptable if the following condition is met:

$$\gamma PL \ll 1,$$

where P is the peak optical power in Watt, and L is the fiber length in meter. Under this rough estimation, fiber delivery of compressed pulses with a peak power more than few kilowatts is not feasible due to undesired nonlinear optical effects such as SPM and Raman. The separation of the input path to the CFBG pulse compressor and the output path of the CFBG pulse compressor 160 shown in FIG. 1 offers a way to construct a very light weight compressor 160 as an optical head for delivering the compressed optical pulses of high peak power to a target without using the delivery fiber line 170, and to deliver stretched optical pulses with low peak optical power (e.g., tens of watts) to the CFBG compressor 160 through the delivery fiber line 170 without causing significant undesired nonlinear optical effects in the delivery fiber line 170. Under this design, the length of the delivery fiber line 170 can vary with specific requirements of an application, and can be, e.g., from several meters to tens of meters.

Specific examples of the CFBG compressor 160 in FIG. 1 are provided below.

Figure 2:
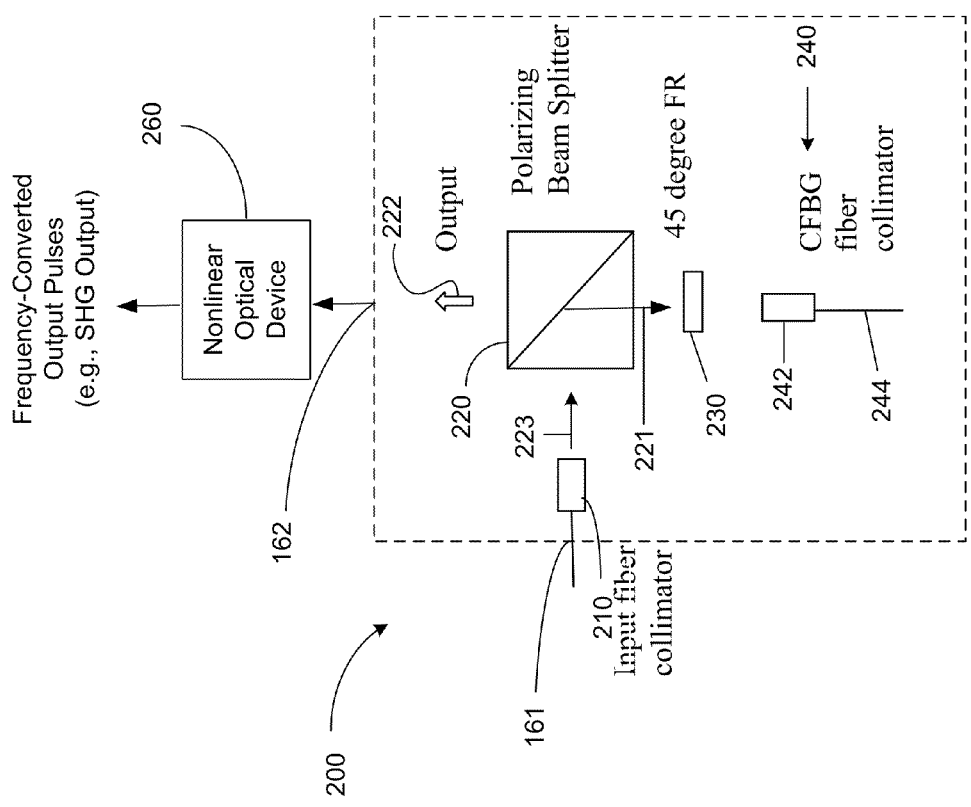
FIGS. 2 and 3 show an example of a chirped fiber Bragg grating compressor that can be used in FIG. 1.

FIG. 2 shows one example 200 of the CFBG compressor 160.

The input optical port 161 is provided to receive input laser pulses at an input laser pulse repetition rate and polarized in an input linear polarization. A polarizing beam splitter 220 is provided to be in optical communication with the input optical port 161, e.g., via free space or a waveguide, to receive the input laser pulses and to direct the received input laser pulses along an optical path 221 out of the polarizing beam splitter 220 at the output port 162. When the delivery fiber line 170 shown in FIG. 1 is used to direct the amplified stretched optical pulses from the optical power amplifier 150 to the pulse compressor 160, an input fiber collimator 210 can be provided to either in communication with or part of the input port 161. The output end of the delivery fiber line 170 is coupled to the input fiber collimator 210 to collimate the light out of the delivery fiber line 170. A chirped fiber Bragg grating device 240 is located in the optical path 221 to receive the input laser pulses from the polarizing beam splitter 220 and includes a fiber terminal section held by a fiber collimator 242 that receives light from the polarizing beam splitter 220 via the optical path 221 and is sufficiently short in length to minimize or reduce pulse broadening or a nonlinear optical effect in each optical pulse propagating through the fiber terminal section. The chirped fiber Bragg grating device 240 includes a chirped fiber Bragg grating section 244 connected to the fiber terminal section to reflect the input laser pulses and to compress pulse durations in the reflected optical pulses to produce reflected optical pulses with compressed pulse durations.

As illustrated in FIG. 2, a polarization rotator 230 is located in the optical path 221 between the polarizing beam splitter 220 and the chirped fiber Bragg grating device 240 to control the polarization of the reflected light from the polarization rotator 230 and the chirped fiber Bragg grating device 240 to be orthogonal to the polarization of the light that is directed to the chirped fiber Bragg grating device 240. A Faraday rotator can be implemented as the polarization rotator 230 to rotate polarization of light by 45 degrees when the light passes through the Faraday rotator 230 and to collect and transmit the reflected optical pulses from the chirped fiber Bragg grating device 240 with compressed pulse durations to the polarizing beam splitter 220 which directs the reflected optical pulses from the Faraday rotator 230 with compressed pulse durations along an output path 222 that is separated from the input path 223 of the input laser pulses to the polarizing beam splitter 220.

Figure 3:
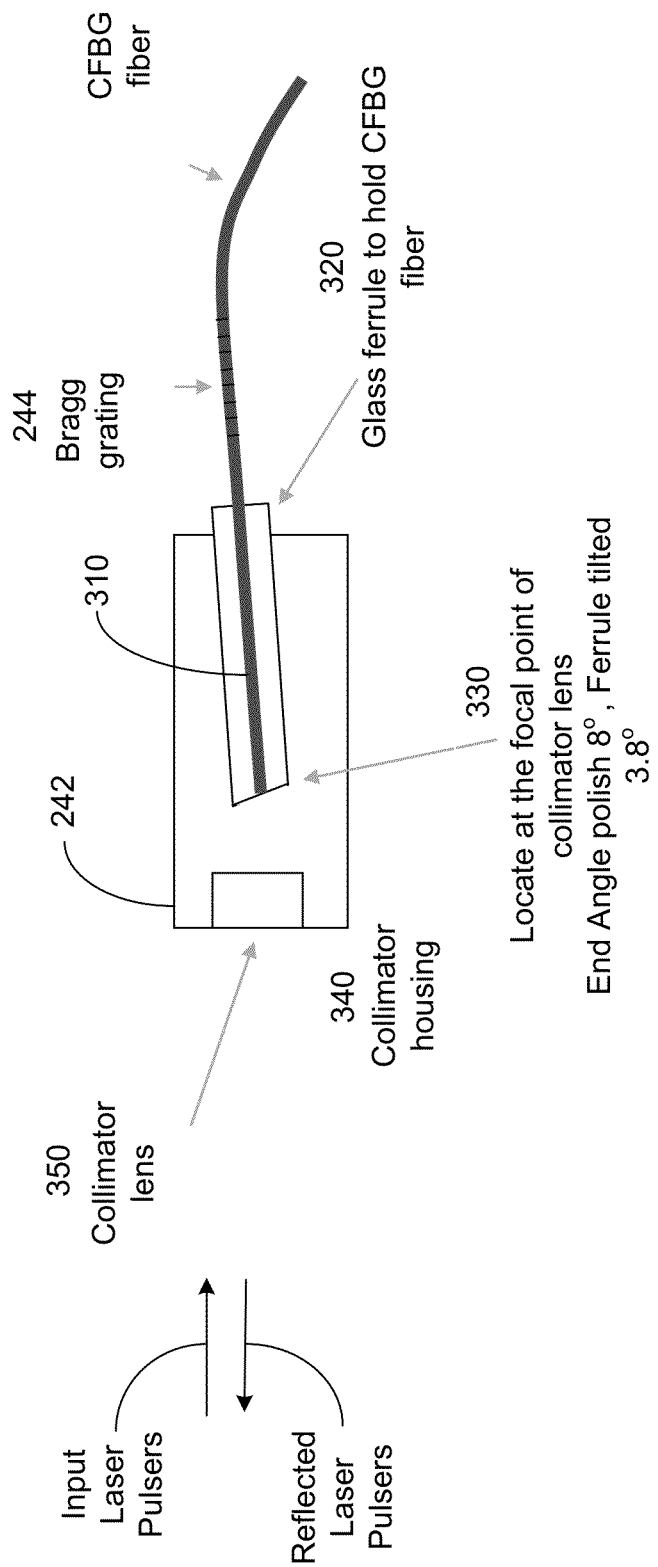

FIG. 3 shows an example of the design of the chirped fiber Bragg grating device 240. In this example, the fiber collimator 242 includes a collimator lens in optical communication with the fiber terminal section 310 of the chirped fiber Bragg grating device 240 to receive the input laser pulses from the Faraday rotator 230 and to direct the reflected optical pulses from the chirped fiber Bragg grating device 240 towards the Faraday rotator 230. A collimator housing 340 is provided to hold the collimator lens 350 relative to the fiber terminal section 310 of the chirped fiber Bragg grating device 240. A fiber ferrule 320, e.g., a glass ferrule, holds the fiber terminal section 310 at a tilted position relative to the optical axis of the collimator lens 350 and is fixed to the collimator housing 340. The end facet 330 of the fiber terminal section 310 forms an angle relative to a longitudinal direction of the fiber terminal section 310. The end facet is located at the focal point of the collimator lens 350 and has an end angle of, e.g., 8 degrees and the ferrule 329 is tilted at e.g., 3.8 degrees. Notably, under this design, the fiber terminal section 310 of the chirped fiber Bragg grating device 240 is sufficiently short in length to minimize or reduce a nonlinear optical effect in each optical pulse propagating through the fiber terminal section 310 and is free from a fiber splicing junction with another fiber.

In some implementations, one end of the Chirped Fiber Bragg Grating fiber, usually the blue end with larger chirped grating periods than the other red end, is inserted into the glass ferrule 320. The ferrule 320 is polished (usually angle polished) to yield optical finish fiber end 330. An anti-reflection coating can be applied to the end 330 to reduce reflection from about 4% to about 0.1%. The polished fiber glass ferrule 320 is inserted into the collimator housing 340. The fiber end is aligned to near the focal point of the collimating lens 350 to form a fiber collimator.

The Chirp fiber Bragg grating (CFBG) in the above design is used to compress high energy chirp optical pulse. The CFBG is put into a micro-optical setup which reduces nonlinearity of the fiber. The setup also enables using the fiber nonlinear effect of the fiber terminal section 310 and the CFGB section 244 to compress pulses to shorter pulse width than a linear compression system. This pulse compressor enables construction of all fiber chirped pulse amplification system at a higher energy.

Referring to FIG. 1, this configuration also facilitates matching of dispersion of the pulse stretcher 130, in which dispersion is proportional to the fiber length and the dispersion in the CFBG compressor 160, which are usually fixed after fabrication.

Fiber lasers have many advantages including compactness, maintenance-free operation, and cost-effectiveness, compared to other lasers. Due to waveguiding nature of optical fibers, they are superior when the beam quality is concerned. However, the same waveguiding nature renders it difficult to amplify short pulses with high peak power. The high peak power of the laser pulses causes Kerr effects in fiber material, which gives rise to undesired nonlinearities such as self-phase modulation. Once the pulse experience the accumulation of nonlinearities, it becomes difficult to obtain short pulses. A Chirped pulse amplifier system (CPA) is a method to get short pulse and high energy. The basic idea is that the low energy short optical pulse is passing through a stretcher to obtain wide pulsewidth. A stretcher is typically a setup with large group velocity dispersion. The stretched pulse is then passing through high power optical amplifier to boost the energy of optical pulse. The wide pulsewidth reduces the peak power in the optical amplifier, therefore reduce the nonlinearity. The high energy stretched pulse is then passing through a optical pulse compressor to obtain short optical pulse typically much smaller than a picosecond. An optical pulse compressor is typically a setup with opposite group velocity dispersion of that of an optical pulse stretcher.

In FIG. 1, the energy level of optical pulses at the optical compressor 160 can be much higher (e.g., 10-1,000,000 times) than that at the optical pulse stretcher 130 due to optical amplification of the optical amplifier 150 between the pulse stretcher 130 and the pulse compressor 160. Managing the optical nonlinearity is a major concern in such a system. Many single mode fiber compressor designs can only tolerate optical pulse energy of a few nanojoules due to limited core diameter of most single mode fibers and the long fiber length required to achieve the required compression. A chirped fiber Bragg grating can be coupled by fusion splice to another fiber to construct a pulse compressor. The existing fusion splice technologies need 0.1-1 meter of fiber length for the fusion spice and this length of fiber in the fusion splice introduces optical nonlinearities that limit the energy level of compressed optical pulses less than a few nanojoule.

The design of the CFBG compressor shown in FIGS. 2 and 3 provides the CFBG chirped fiber Bragg grating in a mico-optics setup to achieve a high energy (e.g., several nano joules to greater than 100 nanojoules) compression in a compact form. By using micro optics as shown in FIGS. 2 and 3, the lead length for the fiber terminal section 310 of the CFBG device 240 can be cut down to few mm length which is one to three order of magnitude less than what can be achieved in fusion splice and other techniques. In implementations, the length of the fiber terminal section 310 can be a few millimeters and less than 10 centimeters. This design lets short pulses and high energy pulses to propagate in fiber for a significantly short distance. This reduces nonlinear interaction length and increases the maximum compressible pulse energy.

The present CFBG compressor design can also be used to compress the optical pulses further in the fiber to achieve a shorter pulsewidth than that of a linear pulse compressor. Optical fiber has nonlinear optical self-phase modulation (SPM), which can generate new frequency components. With optimal control of SPM and dispersion, a significant pulse compression can be achieved in the CFBG compressor a micro-optics setup.

In matching dispersion of the pulse stretcher to the dispersion of the pulse compressor in FIG. 1, the following process can be implemented. The pulse stretcher 130 can be made of fiber in which the length can be controlled by fusion splice, even during the finally assembly of CPA system. One limitation for fiber dispersive devices is that the ratio of the 2nd order dispersion and 3rd order dispersion is fixed for a fiber because the ratio is related to fiber material properties and the waveguide design. The pulse compressor is made of a chirped fiber Bragg grating (CFBG) and its dispersion can be well controlled and engineered prior to CPA manufacturing. Especially that 2nd order dispersion and third order dispersion can be adjusted to various values. The combination of fiber stretcher and CFBG compressor offers an easy way to match the 2nd order dispersion as well the 3rd order dispersion during the manufacturing process.

Figure 4:
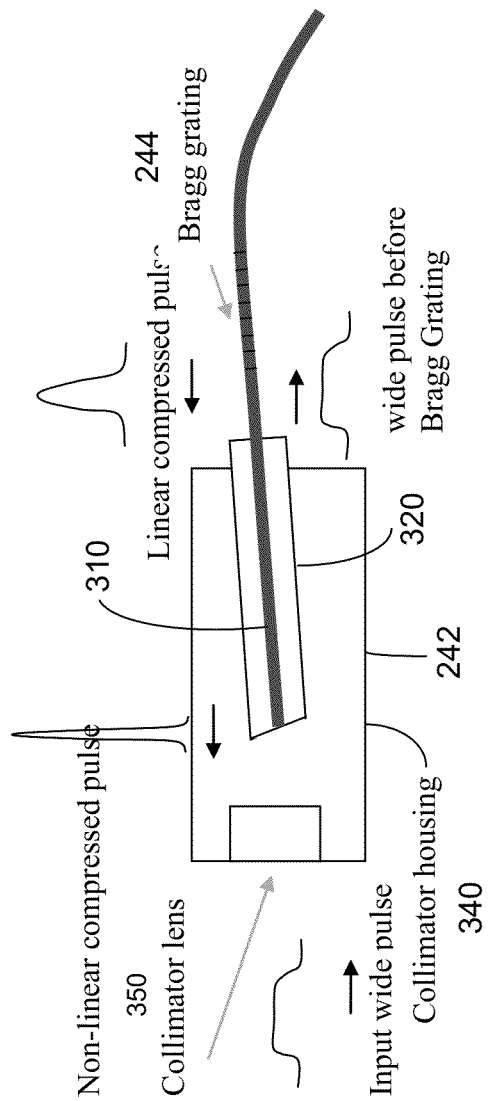
FIG. 4 illustrates an operation of the chirped fiber Bragg grating compressor in FIGS. 2 and 3.

In FIG. 3, the fiber length of the fiber terminal section 310 between the tip of fiber end 330 and the CFBG section 242 is important to determine the nonlinear effects during the compression. This length is minimized during a linear compression. This length of fiber can be controlled for pulse compression when the dispersion in this part of fiber is anomalous. One of the limitation of CPA is the bandwidth narrowing in the fiber power amplifier which usually limits a Er/Yb fiber amplifier to have a bandwidth less than 20 nm. For a linear compressor such as a bulk grating compressor, the shortest pulsewidth achievable from a 20-nm long fiber amplifier may be about 0.18 ps in some designs. This is a significant limitation to many applications. The present fiber pulse compression can be used to overcome this limitation. One example of this design is to have stretched pulses with a pulse duration of 100 ps, a linear chirped bandwidth of 18 nm with a pulse energy of 5.5 nJ. This stretched wide pulse is directed into the collimator lens of the CFBG compressor as shown in FIG. 4.

In FIG. 3, the wide pulses enter the fiber tip 330 to propagate towards the fiber Bragg Grating section 242. Since the wide pulse has a low peak power (e.g., 5.5 nJ/100 ps=55 W), the pulse reaches the fiber Bragg Grating section 242 with its time domain shape and spectrum content with almost no change. The fiber Bragg grating section 242 can be designed to produce nearly exact opposite dispersion to compress the spectral contents in the wide pulse to a short pulse. The Bragg grating section 242 can be designed to have a high reflectivity (e.g., 90%) so that the reflected pulse has 5 nJ energy. The fiber Bragg Grating section 242 can be designed to short (e.g., about 1 cm) for compressing 100-ps pulses, the pulses are linearly compressed to about 0.2 ps. This 0.2 ps pulse with 5 nJ pulse energy has a peak power of about 25,000 W. This pulse experiences a high SPM which generates a new spectral content that interacts with anomoulus dispersion to compress the pulse to a short width. For example, a 0.2 ps, 5 nJ pulse can be so compressed to 77 fs pulsewidth in a PM panda fiber (MFD=10.5 µm, D=17 ps/nm/km) with peak power greater than 40,000 W.

Figure 5A:
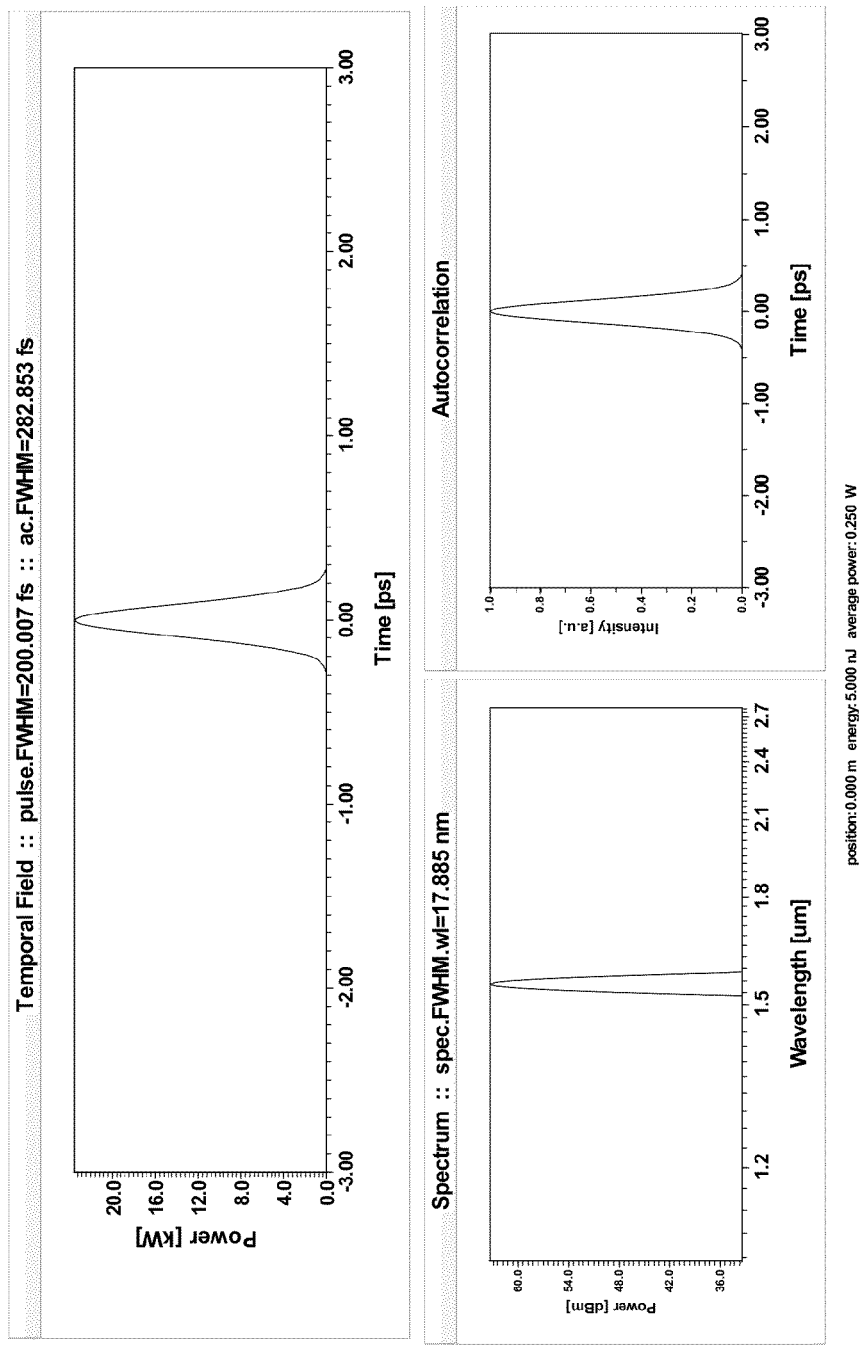
FIGS. 5A and 5B show simulation of fiber nonlinear pulse compression where
Figure 5B:
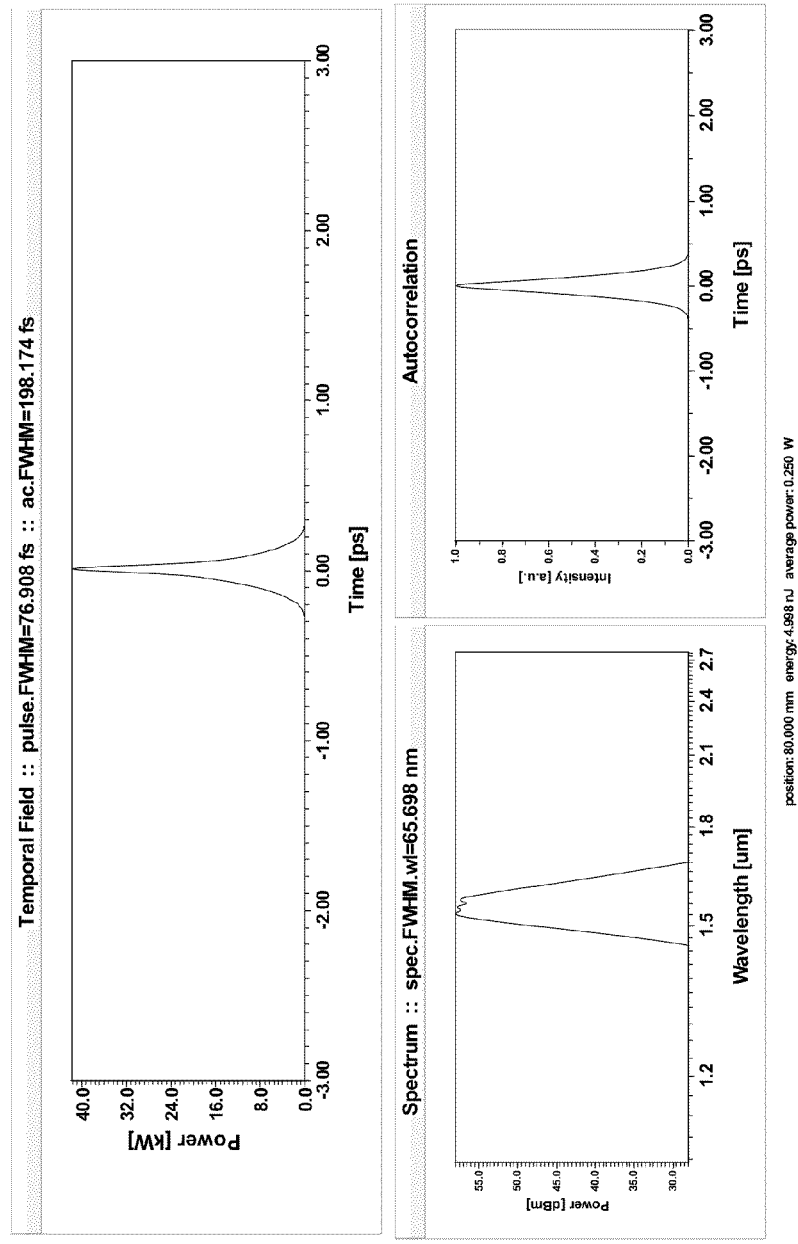

FIGS. 5A and 5B show simulation of fiber nonlinear pulse compression where FIG. 5A shows the pulse parameter before nonlinear pulse compression and FIG. 5B shows the pulse parameter after nonlinear pulse compression in a 80 mm long PM panda fiber. This extra length of fiber is what is shown as the fiber section 310 in FIG. 3.

For fiber laser at 1 µm band, normal fiber has normal dispersion. The linear CFBG pulse compression can be done by keep the fiber after the Bragg Grating short, e.g. about several millimeters in some implementations. To achieve nonlinear pulse compression, the CFBG can be formed on a special photonics crystal fiber which has anomalous dispersion at 1 µm, or the light output from CFBG pulse compressor can be coupled back into a special fiber (such as photonics crystal fiber) with anomalous dispersion.

Notably, the device in FIGS. 1-3 can be designed to control proper dispersion and self-phase modulation to achieve pulse compression based on a soliton effect within the device. Referring to FIG. 3, the fiber section 310 is designed or structured to have an anomalous group velocity dispersion. The high peak power pulse output by the CFBG grating generates SPM when the compressed pulses pass through the fiber section 310. The dispersion and the SFM effects in the fiber section 310 can act as a compressor by itself to cause soliton pulse compression. The soliton pulse compression mechanism in the fiber section 310 is related to a fundamental property of higher-order solitons.

FIGS. 5A and 5B show the simulation of a practical example of such a compression based on the soliton effect and show the optical pulse evolution in the fiber section 310 with the SPM, dispersion and Raman effects.

Referring to FIG. 2, the compressed pulses output by the CFBG pulse compressor at the output port 162 can be further converted to optical pulses at a different optical wavelength using a nonlinear optical device 260 (e.g., a nonlinear crystal). Focusing optics can be used to focus the compressed optical pulses into the nonlinear crystal at the output of the CFBG compressor to cause conversion of energy of the focused input optical pulses to energy of new optical pulses at other wavelengths based on a nonlinear optical effect, e.g., frequency doubling of a second harmonics generator (SHG). Frequency tripling and quadrupling nonlinear effects can be also use to convert the wavelength to even shorter output wavelengths. IN addition, other nonlinear effects, such as, nonlinear optical parametric process and difference frequency generation techniques, can be used to convert the wavelength to longer wavelengths by placing a proper nonlinear optical crystal at the output of the CFBG compressor under proper optical pumping conditions. The high peak power obtained after the pulse compression make the above nonlinear conversion efficient.

The CFBG compressor 160 can be made of a single mode fiber to produce an output beam of a high beam quality. This facilitates the focusing of the laser output into the nonlinear crystal 260. For laser pulses at 1.55 µm, PPLN can be a convenient crystal to generate laser pulses at 775 nm base don second harmonic generation by directing the amplified and compressed laser pulses at 1.55 µm through the crystal. A collimating lens at 780 nm can be used to collimate the laser pulses at 775 nm. For laser pulses at 1 µm, a Mg:PPLN, KTP or LBO crystal can be used for efficient second harmonic conversion.

The compressed optical pulses with high peak power generated from the device in FIG. 1 can be used in a wide range of applications, including imaging, diagnostics, material measurements, medical treatment, surgery and material processing. One of the important applications of short optical pulses is for biomedical multi-photon imaging, it requires optical pulse source to have high peak power to enable strong multiphoton signal. It requires low average power to avoid thermal damage to the live tissues. Ultrafast fiber pulse laser is a good source for biomedical multi-photon imaging. Multi-Photon Imaging (MPI) mostly involves two-photon microscopy. MPI is a fluorescence technique that allows imaging living tissue up to a depth of one millimeter. Two-photon excitation may be a viable alternative to confocal microscopy due to its deeper tissue penetration and reduced photooxicity.

Figure 6:
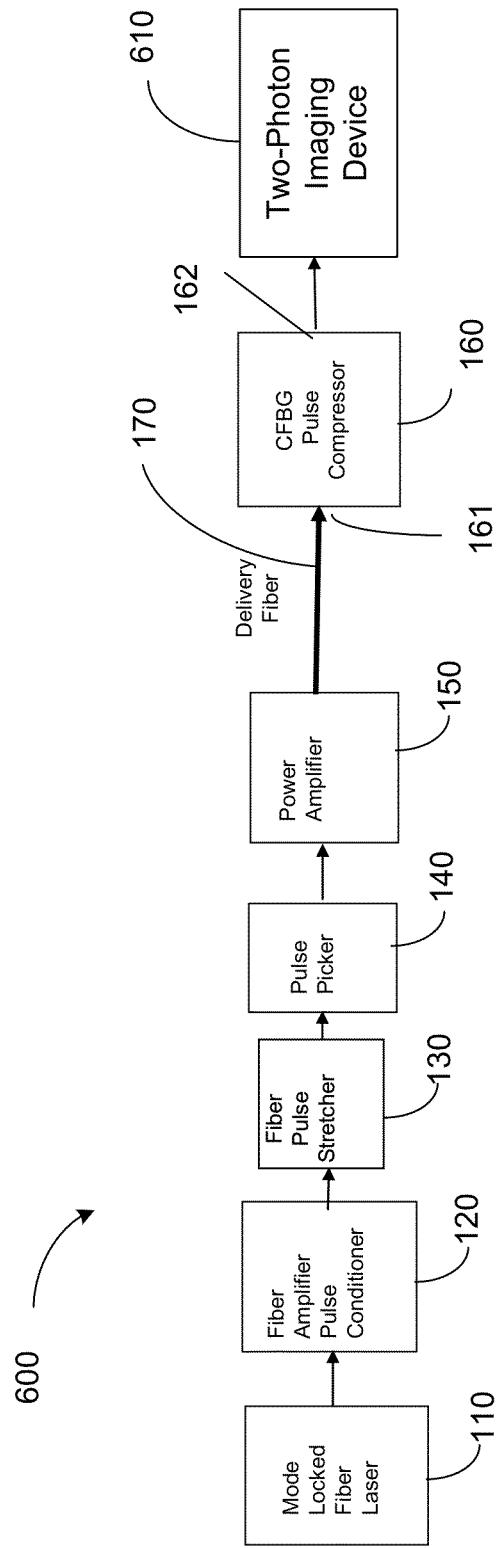
FIG. 6 shows an example of a pulsed laser system for two-photon imaging.

FIG. 6 shows an example of a two-photon microscopic imaging system for obtaining images of a sample. A two-photon imaging device is provided to receive the compressed optical pulses with high peak power generated from the device in FIG. 1. The device 610 guides the optical pulses into the sample to cause generation of two-photon fluorescence in the sample due to localized two-photon absorption. The device 610 collects the light of the two-photon fluorescence from the sample to obtain images of the sample. Two-photon excitation is based on the idea that two photons of low energy can excite a fluorophore in a quantum event, resulting in the emission of a fluorescence photon, typically at a higher energy than either of the two excitatory photons. The probability of the near-simultaneous absorption of two photons is low. Therefore a high flux of excitation photons is required. In two-photon excitation microscopy an infrared laser beam is focused through an objective lens. Femtosecond fiber lasers can provide maintenance free, reliable, compact and low cost features and thus are good light sources for two-photon microscopy.

For machining and surgical applications, a pulse width under 1 picosecond works through ablation rather than heating and melting. Energy deposited by the laser upon a surface cannot thermally propagate a significant distance into the material during the time of the pulse, so thermal effects and material stress are significantly reduced. Deposition of energy in sub-picosecond times causes the surface material to become a plasma that consumes the pulse energy and dissipate in a gas phase, leaving a clear cutting edge. The uncut material remains in original form with greatly reduced stress, fractures, melts, or other unwanted thermal processes. In contrast, a laser with nanosecond or longer pulses, will leave a large "heat affected zone" around the cutting edge, as well as numerous stress fractures.

In these and other applications, the device 610 in FIG. 6 is replaced by a respective optical module such as a laser head for laser cutting and a laser head for laser surgery.

Therefore, a method for amplifying laser pulses is provided. This method includes modifying a train of input laser pulses at an input pulse repetition rate to stretch a pulse duration of each input laser pulse to produce a train of stretched laser pulses; directing the train of stretched laser pulses into an optical power amplifier to amplify the stretched laser pulses; guiding the stretched laser pulses that are amplified by the optical power amplifier through an input optical path; coupling the stretched laser pulses that are amplified by the optical power amplifier from the input optical path into a chirped fiber Bragg grating configured as a pulse compressor, to obtain reflected optical pulses from the chirped fiber Bragg grating with compressed pulse durations; and directing the reflected optical pulses from the chirped fiber Bragg grating with compressed pulse durations along an output optical path in free space, without going through fiber, to produce amplified output laser pulses with compressed pulse durations. The stretching of the optical pulses can cause the pulse duration greater than 20 ps and the pulse duration of the reflected optical pulses from the chirped fiber Bragg grating can be less than 3 ps.

In addition, an optical pulse amplifier device is provided. This device includes an optical pulse stretcher that modifies a train of input laser pulses at an input pulse repetition rate to stretch a pulse duration of each input laser pulse to produce a train of stretched laser pulses, an optical power amplifier that amplifies power of the stretched laser pulses from the optical pulse stretcher; a delivery fiber line coupled to receive the amplified stretched laser pulses from the optical power amplifier and to guide the amplified stretched laser pulses in a first linear polarization; a polarizing beam splitter that receives the amplified stretched laser pulses from the delivery fiber line in the first linear polarization to direct the received amplified stretched laser pulses along an optical path; and a chirped fiber Bragg grating device located in the optical path to receive the amplified stretched laser pulses from the polarizing beam splitter. This chirped fiber Bragg grating device includes a fiber terminal section that receives light from the polarizing beam splitter via the optical path and is sufficiently short in length to minimize or reduce or minimize broadening of each optical pulse propagating through the fiber terminal section, and a chirped fiber Bragg grating section connected to the fiber terminal section to reflect the amplified stretched laser pulses and to compress pulse durations in the reflected optical pulses to produce reflected optical pulses with compressed pulse durations. A polarization rotator is located in the optical path between the polarizing beam splitter and the chirped fiber Bragg grating device to rotate polarization of light to render the reflected optical pulses from the chirped fiber Bragg grating device with compressed pulse durations in a second linear polarization that is orthogonal to the first polarization so that the polarizing beam splitter directs the reflected optical pulses from the polarization rotator with compressed pulse durations along an output path that is separated from a path of the amplified stretched laser pulses from the delivery fiber line to the polarizing beam splitter and is in free space without going through fiber.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made.

What is claimed is:

1. A method for amplifying laser pulses, comprising:
modifying a train of input laser pulses at an input pulse repetition rate to stretch a pulse duration of each input laser pulse to produce a train of stretched laser pulses;
directing the train of stretched laser pulses into an optical power amplifier to amplify the stretched laser pulses;
guiding the stretched laser pulses that are amplified by the optical power amplifier through an input optical path;
coupling the stretched laser pulses that are amplified by the optical power amplifier from the input optical path into a chirped fiber Bragg grating configured as a pulse compressor, to obtain reflected optical pulses from the chirped fiber Bragg grating with compressed pulse durations;
directing the reflected optical pulses from the chirped fiber Bragg grating with compressed pulse durations along an output optical path in free space, without going through fiber, to produce amplified output laser pulses with compressed pulse durations;
adjusting dispersion of the stretched laser pulses with respect to dispersion of the chirped fiber Bragg grating to optimize compressing of the reflected optical pulses in the output optical path of the chirped fiber Bragg grating;
controlling the stretched laser pulses output by the optical power amplifier to be in a first linear polarization;
directing the stretched laser pulses from the optical power amplifier into a polarizing beam splitter which directs the stretched laser pulses from the optical power amplifier towards the chirped fiber Bragg grating;
rotating polarization of light from the polarizing beam splitter by 45 degrees before directing the light to the chirped fiber Bragg grating;
rotating polarization of the reflected optical pulses from the chirped fiber Bragg grating with compressed pulse durations by an additional 45 degrees before directing the reflected optical pulses from the chirped fiber Bragg grating to the polarizing beam splitter; and
using the polarizing beam splitter to separate the stretched laser pulses from the optical power amplifier into the polarizing beam splitter and the reflected optical pulses with compressed pulse durations from the chirped fiber Bragg grating and to direct the reflected optical pulses with compressed pulse durations from the chirped fiber Bragg grating along the output optical path in free space, wherein:
the input optical path includes a delivery fiber line, and the method comprises:
using a polarization rotator located between the polarizing beam splitter and the chirped fiber Bragg grating to rotate polarization of light;
coupling a fiber terminal of the chirped fiber Bragg grating to a collimator lens that receives the amplified stretched laser pulses from the polarization rotator and directs the reflected optical pulses from the chirped fiber Bragg grating towards the polarization rotator; and
using an input fiber collimator coupled to the delivery fiber line to direct the stretched laser pulses from the optical power amplifier into the polarizing beam splitter.

2. The method as in claim 1, comprising:
making the fiber terminal of the chirped fiber Bragg grating to be short to reduce nonlinear optical effects in the reflected optical pulses from the chirped fiber Bragg grating with compressed pulse durations when propagating from the chirped fiber Bragg grating towards the polarizing beam splitter.

3. The method as in claim 2, wherein:
the length of the fiber terminal of the chirped fiber Bragg grating is of a few millimeters.

4. The method as in claim 2, wherein:
the length of the fiber terminal of the chirped fiber Bragg grating is less than 10 centimeters.

5. The method as in claim 2, comprising:
making the reflected optical pulses from the chirped fiber Bragg grating have compressed pulse durations less than 3 ps.

6. The method as in claim 2, comprising:
structuring the fiber terminal of the chirped fiber Bragg grating to have a dispersion that further compresses the reflected optical pulses from the chirped fiber Bragg grating.

7. The method as in claim 2, comprising:
structuring the fiber terminal of the chirped fiber Bragg grating to introduce a dispersion and a self-phase modulation in the reflected optical pulses from the chirped fiber Bragg grating to cause soliton pulse compression in the reflected optical pulses.

8. The method as in claim 1, wherein:
the stretched laser pulses have a pulse width greater than 20 ps.

9. The method as in claim 1, wherein:
the optical power amplifier includes two or more stages of optical power amplifiers.

10. The method as in claim 9, wherein:
a last stage amplifier in the optical power amplifier is a double clad fiber amplifier.

11. The method as in claim 9, wherein:
a last stage amplifier in the optical power amplifier is a solid state optical amplifier.

12. The method as in claim 1, comprising:
prior to directing the train of stretched laser pulses into the optical power amplifier, modifying the train of the stretched laser pulses to have a reduced pulse repetition rate less than the input pulse repetition rate.

13. The method as in claim 1, comprising:
directing the amplified output laser pulses with compressed pulse durations from the polarizing beam splitter into a nonlinear optical crystal to generate optical pulses at a wavelength different from a wavelength of the amplified output laser pulses with compressed pulse durations from the polarizing beam splitter.

14. The method as in claim 1, comprising:
matching a dispersion in each stretched pulse caused by the stretching of the pulse duration of each input laser pulse prior to directing the train of stretched laser pulses into the optical power amplifier with a dispersion caused by the pulse compressor formed by the chirped fiber Bragg grating located downstream from the optical power amplifier.

15. An optical pulse amplifier device, comprising:
an optical pulse stretcher that modifies a train of input laser pulses at an input pulse repetition rate to stretch a pulse duration of each input laser pulse to produce a train of stretched laser pulses;
an optical power amplifier that amplifies power of the stretched laser pulses from the optical pulse stretcher;
a delivery fiber line coupled to receive the amplified stretched laser pulses from the optical power amplifier and to guide the amplified stretched laser pulses in a first linear polarization;
a polarizing beam splitter that receives the amplified stretched laser pulses from the delivery fiber line in the first linear polarization to direct the received amplified stretched laser pulses along an optical path;
a chirped fiber Bragg grating device located in the optical path to receive the amplified stretched laser pulses from the polarizing beam splitter and including a fiber terminal section that receives light from the polarizing beam splitter via the optical path and is sufficiently short in length to reduce or minimize broadening of each optical pulse propagating through the fiber terminal section, and a chirped fiber Bragg grating section connected to the fiber terminal section to reflect the amplified stretched laser pulses and to compress pulse durations in the reflected optical pulses to produce reflected optical pulses with compressed pulse durations; and
a polarization rotator located in the optical path between the polarizing beam splitter and the chirped fiber Bragg grating device to rotate polarization of light to render the reflected optical pulses from the chirped fiber Bragg grating device with compressed pulse durations in a second linear polarization that is orthogonal to the first polarization so that the polarizing beam splitter directs the reflected optical pulses from the polarization rotator with compressed pulse durations along an output path that is separated from a path of the amplified stretched laser pulses from the delivery fiber line to the polarizing beam splitter and is in free space without going through fiber; and
wherein the fiber terminal section is structured to introduce a dispersion and a self-phase modulation in the reflected optical pulses from the chirped fiber Bragg grating to cause soliton pulse compression in the reflected optical pulses.

16. The device as in claim 15, comprising:
a collimator lens coupled to the fiber terminal section of the chirped fiber Bragg grating device to receive the amplified stretched laser pulses from the polarization rotator and to direct the reflected optical pulses from the chirped fiber Bragg grating device towards the polarization rotator.

17. The device as in claim 16, comprising:
a collimator housing that holds the collimator lens relative to the fiber terminal section of the chirped fiber Bragg grating device; and
a ferrule that holds the fiber terminal section at a tilted position relative to the collimator and is fixed to the collimator housing, wherein an end facet of the fiber terminal section forms an angle relative to a longitudinal direction of the fiber terminal section.

18. The device as in claim 15, wherein:
the fiber terminal section is structured to have a dispersion that further compresses the reflected optical pulses from the chirped fiber Bragg grating.

19. The device as in claim 15, wherein:
the length of the fiber terminal section of the chirped fiber Bragg grating device is of a few millimeters.

20. The device as in claim 15, wherein:
the length of the fiber terminal section of the chirped fiber Bragg grating device is less than 10 centimeters.

21. The device as in claim 15, wherein:
the reflected optical pulses from the chirped fiber Bragg grating device have compressed pulse durations less than 3 ps.

22. The device as in claim 15, wherein:
the optical power amplifier includes two or more stages of optical power amplifiers.

23. The device as in claim 22, wherein:
a last stage amplifier in the optical power amplifier is a double clad fiber amplifier.

24. The device as in claim 22, wherein:
a last stage amplifier in the optical power amplifier is a solid state optical amplifier.

25. The device as in claim 15, wherein:
the optical pulse stretcher is structured to make the stretched laser pulses to have a pulse duration greater than 20 ps.

26. The device as in claim 15, comprising:
a pulse picking mechanism located between the optical pulse stretcher and the optical fiber amplifier to reduce a pulse repetition rate of the stretched optical pulses to be less than the input pulse repetition rate.

27. The device as in claim 15, wherein:
the delivery fiber line is a polarization-maintaining fiber.

28. The device as in claim 15, comprising:
a pulsed laser that produces laser pulses as the input laser pulses; and
an initial optical amplifier located between the pulsed laser and the optical pulse stretcher to modify the laser pulses from the pulsed laser into parabolic laser pulses which are stretched by the optical pulse stretcher.

29. The device as in claim 15, comprising:
a nonlinear optical crystal located in the output path to receive the amplified output laser pulses with compressed pulse durations from the polarizing beam splitter to generate optical pulses at a wavelength different from a wavelength of the amplified output laser pulses with compressed pulse durations from the polarizing beam splitter.

30. The device as in claim 15, comprising:
a nonlinear optical crystal located in the output path to receive the amplified output laser pulses with compressed pulse durations from the polarizing beam splitter to generate optical pulses based on second harmonic generation in the nonlinear optical crystal.

31. The device as in claim 15, comprising:
a two-photon microscope located in the output path to receive the amplified output laser pulses with compressed pulse durations from the polarizing beam splitter to produce two-photon microscopic imaging of a sample under illumination of the amplified output laser pulses.

32. The device as in claim 15, wherein:
the polarization rotator is a Faraday rotator that rotates polarization of light by 45 degrees.

33. An optical pulse compressor device, comprising:
an input optical port that includes an input fiber collimator coupled to an input fiber line to receive input laser pulses at an input laser pulse repetition rate and polarized in an input linear polarization;
a polarizing beam splitter to receive the input laser pulses from the input optical port and to direct the received input laser pulses along an optical path out of the polarizing beam splitter;
a chirped fiber Bragg grating device located in the optical path to receive the input laser pulses from the polarizing beam splitter and including a fiber terminal section that receives light from the polarizing beam splitter via the optical path and is sufficiently short in length to minimize or reduce broadening of each optical pulse propagating through the fiber terminal section, and a chirped fiber Bragg grating section connected to the fiber terminal section to reflect the input laser pulses and to compress pulse durations in the reflected optical pulses to produce reflected optical pulses with compressed pulse durations;
a polarization rotator located in the optical path between the polarizing beam splitter and the chirped fiber Bragg grating device to rotate polarization of light to render the reflected optical pulses from the chirped fiber Bragg grating device with compressed pulse durations in a second linear polarization that is orthogonal to the first polarization so that the polarizing beam splitter directs the reflected optical pulses from the polarization rotator with compressed pulse durations along an output path that is separated from a path of the amplified stretched laser pulses from the delivery fiber line to the polarizing beam splitter and is in free space without going through fiber;
a collimator lens coupled to the fiber terminal section of the chirped fiber Bragg grating device to receive the input laser pulses from the polarization rotator and to direct the reflected optical pulses from the chirped fiber Bragg grating device towards the polarization rotator;
a collimator housing that holds the collimator lens relative to the fiber terminal section of the chirped fiber Bragg grating device; and
a ferrule that holds the fiber terminal section at a tilted position relative to an optical axis of the collimator lens and is fixed to the collimator housing,
wherein an end facet of the fiber terminal section forms an angle relative to a longitudinal direction of the fiber terminal section, and
wherein the fiber terminal section of the chirped fiber Bragg grating device is sufficiently short in length to minimize or reduce a nonlinear optical effect in each optical pulse propagating through the fiber terminal section and is free from a fiber splicing junction with another fiber.

34. The device as in claim 33, wherein:
the input fiber line is an input polarization-maintaining fiber.

35. The device as in claim 33, wherein:
the fiber terminal section of the chirped fiber Bragg grating device has anomalous dispersion to minimize a length of the fiber terminal section to reduce undesired nonlinear effect on the reflected optical pulses with compressed pulse durations.

36. The device as in claim 15, wherein:
the fiber terminal section of the chirped fiber Bragg grating device has anomalous dispersion to minimize a length of the fiber terminal section to reduce undesired nonlinear effect on the reflected optical pulses with compressed pulse durations.

37. The method as in claim 1, wherein:
the fiber terminal of the chirped fiber Bragg grating device has anomalous dispersion to minimize a length of the fiber terminal to reduce undesired nonlinear effect on the reflected optical pulses with compressed pulse durations.

* * * * *

UNITED STATES PATENT AND TRADEMARK OFFICE
CERTIFICATE OF CORRECTION

PATENT NO. : 8,730,570 B2
APPLICATION NO. : 12/829364
DATED : May 20, 2014
INVENTOR(S) : Lin

Page 1 of 1

It is certified that error appears in the above-identified patent and that said Letters Patent is hereby corrected as shown below:

In the Specification

Column 4, Lines 51-52, delete "pulse picker 130" and insert -- pulse picker 140 --, therefor.

Column 7, Line 50, delete "CFGB" and insert -- CFBG --, therefor.

Column 9, Line 36, delete "anomoulus" and insert -- anomalous --, therefor.

Column 9, Line 63, delete "SFM" and insert -- SPM --, therefor.

Column 10, Line 29, delete "base don" and insert -- based on --, therefor.

Column 10, Line 50, delete "photooxicity." and insert -- phototoxicity. --, therefor.

Signed and Sealed this
Eleventh Day of November, 2014

Michelle K. Lee
*Deputy Director of the United States Patent and Trademark Office*